United States Patent [19]

Faubel et al.

[11] Patent Number: 4,826,604

[45] Date of Patent: May 2, 1989

[54] PROCESS FOR SEPARATION OF CESIUM IONS FROM AQUEOUS SOLUTIONS

[75] Inventors: Werner Faubel, Eggenstein-Leop.; Sameh A. Ali, Ettlingen, both of Fed. Rep. of Germany

[73] Assignee: Kernforschungszentrum Karlsruhe GmbH, Karlsruhe, Fed. Rep. of Germany

[21] Appl. No.: 69,438

[22] Filed: Jul. 2, 1987

[30] Foreign Application Priority Data

Jul. 5, 1986 [EP] European Pat. Off. ........... 86109194

[51] Int. Cl.[4] ................................................ C02F 1/42

[52] U.S. Cl. ..................................... 210/661; 210/682

[58] Field of Search ............... 210/681, 682, 688, 661; 423/21.5

[56] References Cited

U.S. PATENT DOCUMENTS

| | | | |
|---|---|---|---|
| 3,017,242 | 1/1962 | Ames | 210/682 |
| 3,296,123 | 1/1967 | Prout et al. | 210/682 |
| 3,316,066 | 4/1967 | Smit | 210/682 |
| 3,453,214 | 7/1969 | Bonnin et al. | 210/682 |
| 3,484,216 | 12/1969 | Ahrland | 210/682 |
| 4,460,474 | 7/1984 | Blasius et al. | 210/681 |

FOREIGN PATENT DOCUMENTS 914004 12/1962 United Kingdom .

OTHER PUBLICATIONS

J. Van R. Smit et al., "Separation of Cesium from Fission Product Wastes by Ion Exchange on Ammonium Molybdophosphate", Industrial & Engineering Chemistry, vol. 5, No. 2, pp. 117–122 (1966).

*Primary Examiner*—Ivars Cintins
*Attorney, Agent, or Firm*—Spencer & Frank

[57] ABSTRACT

The invention relates to a process for continuous or almost continuous separation of cesium ions from aqueous solutions having high concentrations of sodium and/or potassium ions by ion exchange with ammonium molybdophosphate (AMP).

A quantitative cesium separation from aqueous solutions which are high in salts, especially from highly radioactive solutions which are strongly nitric and contain nitrate, is achieved, without having to consider bleeding of the AMP and/or undesirable local overheating in the exchanger.

7 Claims, 1 Drawing Sheet

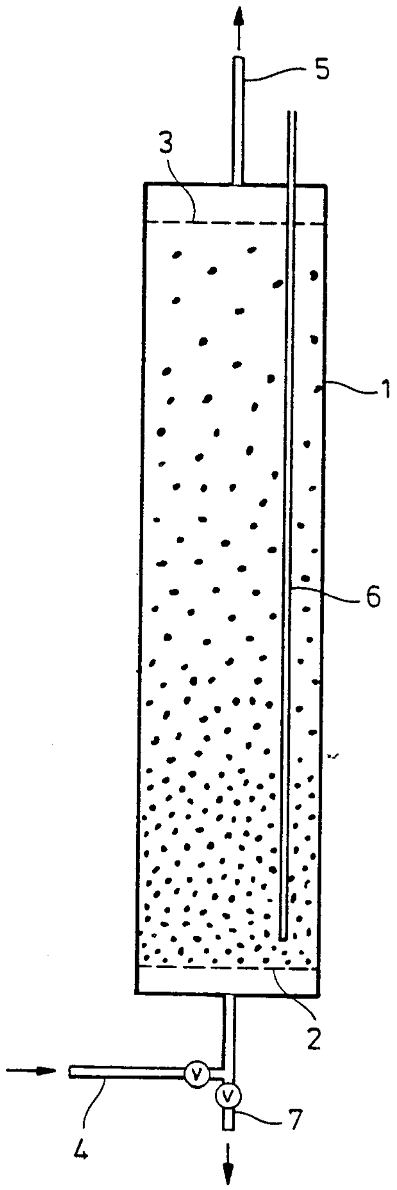
5
3
1
6
2
4
7
V
V

PROCESS FOR SEPARATION OF CESIUM IONS FROM AQUEOUS SOLUTIONS

FIELD OF THE INVENTION

The invention relates to a process for continuous or almost continuous separation of cesium ions from aqueous solutions containing high concentrations of sodium and/or potassium ions by ion exchange.

TECHNOLOGY REVIEW

Numerous ion exchange and extraction systems have been proposed before this time for the separation of cesium ions from aqueous reaction solutions, for example nitric solutions, including in the presence of high salt concentrations. Most of these systems suffer from an undesirable sensitivity to variations of the acid content or the foreign salt concentration, especially in the foreign nitrate concentration. Cesium separation is especially important in the field of the removal of radioactive cesium ions contained in waste water or sewage. High nitrate levels are encountered there particularly in the MAW evaporation concentrates, in which sodium nitrate represents by far the greatest portion of the entire salt content in the aqueous concentrate.

An extremely high selectivity ion exchange material for cesium ions as compared with other alkali ions is known for the inorganic ammonium molybdophosphate phosphate, $(NH_4)_3[PNO_{12}O_{40}]$ ion exchanger, which is commercially available under the name AMP-1. However, this ion exchange material has not come into general use because AMP-1 is always in a microcrystalline state. As a result, in normal operation, fairly long columns filled with this material are practically impermeable. Another drawback of a column filled with AMP-1 is the heat rise with the exchange of radioactive cesium in the column because of the high cesium distribution coefficients under highly radioactive (hot) conditions. Attempts to avoid these difficulties by coating AMP on carrier substances, such as e.g. silica gel etc., have been unsatisfactory in the extractability and in the bleeding of the molybdophosphate from the carrier substance. Consequently the concentration of AMP in the column progressively decreases. Further drawbacks for example are the unsolved problem of the reusability of the extraction and exchange apparatus itself, as well as the weak exploitation of the absorbant capacity. The handling and treatment of such highly radioactive columns is an unsolved problem.

SUMMARY OF THE INVENTION

The invention provides a process for quantitative cesium separation from aqueous solutions, including high salt content aqueous solutions, especially from highly radioactive solutions containing nitrates and nitric acid, without bleeding of the ion exchange material and/or undesirable local overheating in the exchanger. The process of the invention may be performed continuously or almost continuously. It is an advantage of the invention that a high number of bottom layer volumes of solution containing cesium ions can be passed through the exchanger before the ion exchange material volume needs to be replaced.

BRIEF DESCRIPTION OF THE DRAWING

The drawing is a diagrammatic representation of an example of a device as it can be used for implementation of the process.

DETAILED DESCRIPTION OF THE INVENTION

The process of the invention includes:

(a) a starting solution with a pH$\leqq$9.5 and containing cesium ions and also containing sodium and/or potassium ions is fed through microcrystalline ammonium molybdophospate (AMP) lying loosely on a porous substrate within a container or in a layer produced by deposition and suspended over the substrate, whereby ammonium ions are exchanged for the cesium ions and the less soluble cesium-molybdo phosphate is formed, (b) a uniform flow of the starting solution is provided with the provision that the AMP microcrystals not be carried out of the container with the decontaminated solution from which cesium ions have been removed, (c) the decontaminated solution from which cesium ions have been removed is withdrawn continuously over the microcrystalline AMP layer or over the top surface of a suspended volume of AMP microcrystals, (d) when the ion exchange material in the exchanger is exhausted, the feed of starting solution is halted, the exchanger is washed with water and the water is siphoned off and then the ion exchange material is flushed out of the container or is dissolved with strongly alkaline aqueous solution and removed from the container and (e) a fresh AMP layer is introduced into the container and steps (a) through (d) are repeated as often as desired with starting solutions containing cesium ions.

It is advantageous that the uniform flow of the starting solution containing cesium ions be determined with the provision that the total suspended volume of AMP microcrystals introduced into the container does not exceed $\frac{7}{8}$ of the level of the liquid column in the container.

The porous substrate to be placed in the container, on which the loose layer of microcrystalline AMP is placed, may for example consist of a high-grade steel powder metal frit. The flowthrough velocity of the starting solution from which cesium ions are to be removed, which contains a low concentration of cesium ions and very high salt concentrations relative thereto, can be varied within a wide range according to dimensions of usable space in the AMP or the column or the container. Practically speaking, the flowthrough velocity can be set so that the AMP microcrystals in the bottom part of the volume of the starting solution can be held in suspension, but the discharge opening of the container for the decontaminated solution is not reached. After the ion exchange material in the exchanger is loaded (i.e. converted to cesium-molybdo phosphate), the starting solution containing cesium is interrupted and the starting solution standing over the resettled AMP layer is siphoned off or pressed down out of the column with a tube introduced at a proper level. The solution from which cesium ions have been removed is replaced by water. The AMP is thus freed of residues of acidic solution. Then the remaining washing solution is removed by suction.

The ion exchange material in the exchanger loaded with cesium ions can now be dissolved in ammonium hydroxide or sodium hydroxide solution and the waste solutions arising therefrom at the bottom end of the container are drawn off, without any change of the apparatus or complicated operation with the apparatus. In another embodiment the AMP however can also be flushed out of the device. The exchanger waste solution or suspension containing cesium can thereafter be mixed homogeneously in a simple manner with the matrix provided for the disposal of waste (for example for vitrification radioactive wastes or for the cementing of such wastes) or be fed to a further chemical treatment to obtain cesium commercially. Sodium hydroxide solution is more suitable for use as solvent in highly radioactive systems on account of the greater radiation resistance. Following the washing of the container or column fresh AMP can be fed to the exchanger, for instance by a pump through the decanting tube into the apparatus. The decanting tube which is immersed in the solution can be configured so that it can be raised vertically if required. In another embodiment it can be introduced into the column from the side.

The device consists essentially of a container or a column, for example a cylindrical tube member 1, which is provided with input lines 4, 6 and discharge lines 5, 6, 7 at its ends and at least at the bottom end with a frit 2. The AMP is fed in through the delivery tube 6 as a powder before the beginning of the process, so that it lies loosely on the frit 2. Otherwise the AMP can be fed through 6 as a suspension in the medium which is to be decontaminated thereafter. The porosity of frit 2 plays no role, since it is solely to prevent the AMP falling through, and the standard pore size in the frit is 3 to 15 micrometers. The solution containing cesium is then introduced into the device through feed line 4 at a uniform flow velocity. This can be obtained by hydrostatic pressure or by a pump etc.

Thus the AMP rises slowly upward with the flow, is distributed in the liquid and forms a density gradient from frit 2 upward. The flow velocity is determined so that the top end of the column, out of which the decontaminated solution flows through discharge 5, remains free of AMP particles. To be sure of this, a 0.5 micrometerfrit 3 can be introduced at the top end, which prevents AMP discharge from the column during eventual fluidization of the AMP, whether it is thrown up by too rapid pumping action or by air blasts. This filter could also be an "in-line-filter" built into discharge line 5 before introduction of the solution into the vessel (not shown in the drawing). With maintenance of certain processing conditions, however, frit 3 is not required. After conclusion of the charging of the AMP with cesium (maximum capacity about 60 g cesium/kg AMP), the feed of the processing solution through feed 4 is halted and the AMP is allowed to settle.

The solution standing over the AMP is emptied from the column through delivery pipe 6 or the solution portion still remaining in the device is allowed to flow through discharge line 7, and additional compressed gas (air, $N_2$, Ar etc.) can be fed into the device through line 5 to accelerate the discharge process. In case of need the column can be blown dry.

The solutions required for dissolution of the AMP or flushing the device are fed in through inlet (the inlet feed line) 4 or in emergency through lines 5, 6, 7 and leave column 1 in the traditional manner through discharge pipe 5 during continuous operation, or delivery tube 6, after deposition of the AMP, or (after discharge and emptying of delivery pipe 6) through discharge pipe 7.

The continuous or almost continuous process according to the invention has shown a surprising advantage in comparison with a conventional discontinuous process, for example in a beaker glass (batch processing), which works with pure AMP, and also relative to a process in which the AMP was coated onto a support structure. During batch processing, a decontamination factor (DF) for cesium ions of on the order of $10^2$ can be attained, the process according to the invention achieves a DF of greater than 60,000, with higher radioactive starting material a DF on the basis of the remaining slight residual activity of greater than 100,000 can be achieved. The indication "greater than" used here before the numerical value means that the cited numerical value can be overall higher, but it cannot be calculated quite correctly, because the residual activity lies in the vicinity of the detection limit.

SPECIFIC EXAMPLES

In order that those skilled in the art may better understand how the present invention may be practiced, the following examples are given by way of illustration, and not by way of limitation.

EXAMPLE 1

1 liter of pure medium radioactive waste solution (MAW) with a dose of 8 R/h (in contact) was pump fed through an organic absorbant material (Bio Bed SM7 of Bio Rad Company), which was filled into a column ($\phi=20$ mm, H=200 mm). As a result, the organic impurities of the MAW concentrate solution were removed from the aqueous phase. Solid particles were collected in an "in-line-filter", which was mounted in front of the column. By this step, the radiation dose was lowered to 3.5 R/h.

Then the aqueous solution cleaned of organic and solid impurities was conducted with a flow rate of 10 column volumes through a cesium collection column, as shown in the drawing, with 4 g of AMP-1 on the frit column (diameter $\phi=20$ mm; height, H=200 mm). The solution was collected in a container and subjected to a gamma $\gamma$ measurement. Only Cs-134 and Cs-137 were removed and these with a decontamination factor of DF greater than 60,000, given by the detection limit of the gamma $\gamma$ spectrometer. No local overheating occurs with this continuous process, since the AMP-1 is cooled while moving and after use it is dissolved in a NaOH solution.

Then the pump was disconnected and after rapid deposition of the AMP-1 the remaining, already decontaminated solution was removed through the delivery pipe and fed to the decontaminated solution. The entire does in the vessel was still 0.7 R/h. After flushing the column with water (200 ml), the excess aqueous solution was likewise removed from the column through the delivery pipe (after deposition of the AMP-1); the dissolution of the AMP-1, charged with Cs, occurred with 20 ml M NaOH solution, fed into the column from below. The waste solution was then allowed to flow downward out of the column. After a final $H_2$0 washing of the column, the column was again fed fresh AMP-1 through the delivery pipe and the procedure was repeated with fresh MAW.

EXAMPLE 2

100 liters of simulated MAW (with traces of Cs-132) were pumped at a flow rate of 50 column volumes through an AMP column ($\phi=85$ mm; H=500 mm), which was coated with 10 g AMP-1. The decontamination factor for cesium of the solution collected in a vessel was above 60,000.

After loading the exchanger the pump was disconnected, and after deposition of the AMP-1 charged with cesium, the remaining, already decontaminated solution was siphoned off through the delivery pipe.

Then the column was flushed with 5 liters of water upward from the bottom, and the main portion of the flushing water remaining in the column was also removed through the delivery pipe—after deposition of the AMP-1. The AMP-1 containing Cs was then dissolved in 100 ml of 1 M NaOH solution, fed in from below. This waste solution was allowed to flow downward.

Then the apparatus was rinsed with $H_20$ and a new charge of AMP-1 was fed in through the delivery pipe. This procedure was repeated 10 times and thus one cubic meter volume of simulated MAW was processed—corresponding to expectations for a regeneration treatment plant (with 4 g Cs).

TABLE 1

| | |
|---|---|
| Al | 0.23 g/l |
| Ca | 1.5 g/l |
| Cr | 0.08 g/l |
| Cs | 0.0036 g/l |
| Cu | 0.15 g/l |
| Fe | 0.38 g/l |
| U | 0.08 g/l |
| Mg | 0.75 g/l |
| Mn | 0.08 g/l |
| K | 0.08 g/l |
| Mo | 0.38 g/l |
| Na | 81.14 g/l |
| Ni | 0.08 g/l |
| Sr | 0.001 g/l |
| Zn | 0.15 g/l |
| Zr | 0.08 g/l |
| $HNO_3$ | 1 Mol/l. |

EXAMPLE 3

Comparison of the decontamination factors (DF) of (a) 3 static tests (batches)

(b) the corresponding dynamic tests (process of the invention in the AMP column) for the simulated MAW described in Example 2.

Each 100 ml of simulated MAW with different cesium amounts was treated both statically (a) and dynamically (b) with 1 g AMP-1 for each treatment.

(a) The batch experiments were carried out in 250 ml plastic flasks, and the solution was brought for 10 minutes into close contact with the AMP-1. After heating and centrifugating the Cs content in the remaining solution was determined.

(b) The dynamic experiments were carried out as in Example 1. The flow rate was 10 column volumes per hour. The results are shown in Table 2.

TABLE 2

| Test No. | AMP-1 (g) | Solutn. (ml) | Cs-conc. (mol/l) | DF (a) batch | DF (b) dyn. |
|---|---|---|---|---|---|
| 1 | 1 | 100 | $3.2 \times 10^{-4}$ | 450 | >100,000 |
| 2 | 1 | 100 | $1.6 \times 10^{-3}$ | 127 | >100,000 |
| 3 | 1 | 100 | $4.8 \times 10^{-3}$ | 90 | >100,000 |

This table shows the unambiguous superiority of the process according to the invention for batch processing experiments. Even with greater loads in the exchanger, a DF is attained which is still greater than 60,000, which is limited by the detection limit of the gamma $\gamma$ spectrometer, while in the batch experiments with increasingly greater charge the DFs drop from 450 to 90.

The present disclosure relates to the subject matter disclosed in European patent application No. 86-109194.0 filed July 5, 1986, the entire specification of which is incorporated herein by reference.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A process for separation of cesium ions from an aqueous solution containing cesium ions, sodium ions, potassium ions, or mixtures thereof, comprising:

(a) feeding a starting solution containing cesium ions and sodium ions, potassium ions, or mixtures thereof with a pH $\leqq 9.5$ into a lower portion of a container, said starting solution flowing upwardly through a suspension of microcrystalline ammonium molybdophosphate, (b) continously feeding said starting solution into said lower portion of said container at a rate to permit said cesium ions to form cesium molybdophosphate and a solution free of cesium ions, and to prevent any ammonium molybdophosphate or cesium molybdophosphate from being carried upwardly out of said container, and (c) withdrawing solution free of cesium ions from an upper portion of said container.

2. The process for continuous separation of cesium ions from an aqueous solution set forth in claim 1, including:

(d) periodically interrupting said continuous feeding of starting solution into said container, removing said cesium molybdophosphate from said container, adding additional ammonium molybdophosphate to said container, and resuming continuous feeding of starting solution into said container.

3. A process for separation of cesium ions from an aqueous solution as set forth in claim 1, wherein said suspension of microcrystalline ammonium molybdophosphate does not rise above about $\frac{7}{8}$ of the liquid height in said container.

4. A process for separation of cesium ions from an aqueous solution as set forth in claim 1, wherein said aqueous solution contains cesium ions and sodium ions.

5. A process for separation of cesium ions from an aqueous solution as set forth in claim 1, wherein said aqueous solution contains cesium ions and potassium ions.

6. A process for separation of cesium ions from an aqueous solution as set forth in claim 1, wherein said aqueous solution contains cesium ions and a mixture of sodium ions and potassium ions.

7. A process for separation of cesium ions from an aqueous solution as set forth in claim 1, including filtering said solution free of cesium ions before withdrawing said solution free of cesium ions from an upper portion of said container.

* * * * *